US008752384B2

(12) United States Patent
Polvi

(10) Patent No.: US 8,752,384 B2
(45) Date of Patent: Jun. 17, 2014

(54) CARBON DIOXIDE CAPTURE INTERFACE AND POWER GENERATION FACILITY

(76) Inventor: Esko Olavi Polvi, Pittsburgh, PA (US)

( * ) Notice: Subject to any disclaimer, the term of this patent is extended or adjusted under 35 U.S.C. 154(b) by 259 days.

(21) Appl. No.: 13/013,483

(22) Filed: Jan. 25, 2011

(65) Prior Publication Data

US 2011/0113779 A1 May 19, 2011

Related U.S. Application Data

(60) Provisional application No. 61/297,981, filed on Jan. 25, 2010, provisional application No. 61/320,889, filed on Apr. 5, 2010.

(51) Int. Cl.
*F01K 23/10* (2006.01)
*F01K 23/06* (2006.01)
*F23C 10/16* (2006.01)

(52) U.S. Cl.
CPC .............. *F01K 23/062* (2013.01); *F23C 10/16* (2013.01)
USPC .......................................................... 60/670

(58) Field of Classification Search
USPC ............................. 60/646, 655, 670, 685, 694
See application file for complete search history.

(56) References Cited

U.S. PATENT DOCUMENTS

| 4,425,757 A | 1/1984 | Heyn et al. |
| 4,542,621 A | 9/1985 | Andersson et al. |
| 6,655,150 B1 | 12/2003 | Åsen et al. |
| 2007/0227118 A1 | 10/2007 | Hu et al. |
| 2008/0104958 A1* | 5/2008 | Finkenrath et al. .......... 60/605.2 |
| 2011/0149300 A1* | 6/2011 | Takeda ........................ 356/614 |
| 2011/0314815 A1* | 12/2011 | Li et al. ......................... 60/645 |

FOREIGN PATENT DOCUMENTS

| EP | 2261631 | 12/2010 |
| WO | 2009025003 | 2/2009 |
| WO | 2009122947 | 10/2009 |

* cited by examiner

*Primary Examiner* — Kenneth Bomberg
*Assistant Examiner* — Jonathan Matthias
(74) *Attorney, Agent, or Firm* — Cohen & Grigsby, PC

(57) ABSTRACT

An interface for a pressurized fluidized bed combustion facility is disclosed that enables future addition of carbon dioxide capture technology to capture facility flue gas emissions. The interface includes a gas to water pressurized heat recovery steam generator to cool facility flue gas and provide steam to the facility steam turbine generator. A VFD motor and flue gas expander are coupled to a combustion air compressor to energize the facility. The expander is synchronized over a SSS-clutch to drive the compressor. The interface in combination with carbon capture technology and methods for conditioning flue gas are also disclosed.

20 Claims, 4 Drawing Sheets

Typical Process Conditions at 90% CO₂ removal

|  |  | A | B | C | D | E | F | G | H | J | K | L |
|---|---|---|---|---|---|---|---|---|---|---|---|---|
| Temperature: | deg F | 1300-1700 | 350-650 | 300-600 | 300-400 | 212-350 | 212-230 | 190-210 | 1005 | 1005 | 1005 | |
| Pressure: | PSI | 150-260 | 145-255 | 140-250 | 135-245 | 130-240 | 120-230 | 14.5 | 1450 | 1450 | 1450 | |
| Gas Flow: | % | 100+L | 100+L | 100+L | 100+L | 100+L | 80+L' | 80+L' | | | | |
| Steam Flow | lb/hr | | | | | | | | 200000-400000 | Depends on Benfield Process | H-J | |
| Mole Fraction of: | | | | | | | | | | | | |
| N₂ | % | 65 | 65 | 65 | 71 | 71 | 82 | 82 | Steam | Steam | Steam | Gas |
| CO₂ | % | 13 | 13 | 13 | 14 | 14 | 1.5 | 1.5 | | | | |
| SO₂ | % | 0.03 | 0.03 | 0.03 | 0 | 0 | 0 | 0 | | | | |
| O₂ | % | 5 | 5 | 5 | 5.5 | 5.5 | 6 | 6 | | | | |
| H₂O | % | 16 | 16 | 16 | 9 | 9 | 10 | 10 | | | | |

FIG. 4

CARBON DIOXIDE CAPTURE INTERFACE AND POWER GENERATION FACILITY

BACKGROUND OF THE INVENTION

Various pollution control technologies have been implemented to control emissions from fossil fuel burning facilities, such as fossil fuels which are used for power generation. The pressurized fluidized bed combustion (PFBC) technology is being developed to utilize wet waste coal for highly efficient power generation with minimal emissions of sulfur dioxide, nitrogen oxide, and mercury. However, as with other power generation processes that utilize fossil fuels, PFBC produces carbon dioxide ($CO_2$) emissions. The upcoming $CO_2$ regulation will require new carbonaceous fuel burning power plants to have means for $CO_2$ capture. Thus, the readiness to capture these $CO_2$ emissions will dictate the viability of applying the PFBC technology on a commercial scale to utilize wet waste coal or other carbonaceous fuels for power generation.

Currently, the only presently commercially used technology for carbon capture known to the inventor, that is potentially suitable for the pressurized PFBC process, is the Benfield technology that is owned by UOP Inc. In that process, as described in U.S. Pat. No. 4,496,371 and elsewhere, carbon dioxide, hydrogen sulfide and other acid gas components are removed from a hydrocarbon containing vapor steam by absorption into a pressurized aqueous potassium carbonate solution. However, even though the pressure at which the Benfield process operates would be compatible with the PFBC process, some other process conditions, such as the maximum allowable temperature for the $CO_2$ capturing agent and the level of $SO_2$, and $NO_x$, prevent the Benfield process from being readily adaptable for use with PFBC technology. Thus, to efficiently utilize carbonaceous fuels for power generation there is a need for an effective interface between the PFBC technology and pressurized carbon capture technology, such as the Benfield technology.

There is also a need for efficient power generation facilities to be capable of capturing pollutants that would be emitted from combustion gas such as carbon dioxide. There is a further need for such power generation facilities to have low emissions of sulfur oxides, nitrogen oxides, volatile organic compounds, carbon monoxide and particulate matter.

SUMMARY OF THE INVENTION

In embodiments the present invention is directed to an interface between a pressurized carbonaceous fuel combustion unit (such as a PFBC Boiler in a PFBC facility) and a treatment unit to capture carbon dioxide from the PFBC facility. In general, the inventor has discovered that the flue gas coining from the PFBC Boiler can be conditioned to be compatible with existing carbon capture technology such as the pressurized $CO_2$ separation process of the Benfield process.

In various embodiments, the invention is directed to a PFBC facility—carbon dioxide capture system interface having a carbon dioxide capture bypass mode. In this embodiment the carbon dioxide capture system can be bypassed as needed. For example, it may be desirable to bypass the carbon dioxide capture system to service the capture system or repair it while the PFBC facility remains in operation (of course, though, during that period the flue gas would not be cleaned from $CO_2$). The bypass also provides an operational feature that can be used during start up until the flue gas conditions are right for the carbon dioxide capture system.

In various embodiments, the invention is directed to a readiness interface for a PFBC facility or power plant. The readiness interface equips the power plant so that it is ready to be fit with carbon dioxide capture capability at some future date. The power plant can be built and fully functional without such carbon dioxide capture, and yet ready for capture capabilities, which could be added later without need for any changes to the power plant. In various embodiments, the interface requires a heat recovery steam generator (HRSG) and a flue gas expander. The HRSG is configured to cool the carbonaceous flue gas from the fuel combustion unit and convert the energy in the flue gas temperature reduction to generate steam for electrical energy in the PFBC steam turbine generator for the drive of the combustion air compressor.

The invention is also directed to methods for conditioning pressurized flue gas from a pressurized fluidized bed combustion facility. The flue gas is treated and recycled to supplement the power needed to run the combustion facility.

Typically, in the standard PFBC cycle, a gas turbine uses flue gas from the PFBC boiler to drive the combustion air compressor. For the interface, the standard flue gas driven gas turbine compressor is replaced with a compressor driven by an electrical variable frequency drive (VFD) motor and a flue gas expander. The flue gas is cleaned and used to drive the flue gas expander. The flue gas expander convert the energy in the pressure reduction to additional torque to assist the VFD to drive the combustion air compressor. Compared to a $CO_2$ capture process based on the standard PFBC process with the gas turbine, the use of the HRSG/VFD motor/gas expander combination will give a greater freedom to minimize the amount of energy losses due to the $CO_2$ capture process and thereby improve efficiency. Rather than as in the standard PFBC technology, which uses a standard frame size of a gas turbine driven compressor that limits the available amount of combustion air and to operate efficiently has a gas turbine that requires high gas temperature and flue gas mass flow, a VFD motor in combination with a flue gas expander is used to drive the compressors for supply of the combustion air to the PFBC process. The VFD motor and gas expander combination boosts the overall flexibility of the interface by allowing for greater ranges of compressor capacity and gas temperature. Thus the combustion air supply, gas temperatures, and the PFBC boiler size can be selected more freely.

In embodiments, the interface uses a combination of an electrical VFD motor and a gas expander driven compressor to provide the full combustion air flow to the PFBC boiler process. The gas expander is equipped with a SSS-clutch. During start-up the VFD motor will solely drive the compressor until the gas expander is ready to engage through its SSS-clutch and contribute to the power needed to drive the compressor up to full load. In embodiments for increased thermal power, duct firing is added to the HRSG for use of alternate gaseous fuels.

In embodiments of the invention, the Benfield process is bypassed and the carbonaceous flue gas is directly routed to a gas expander.

In various embodiments, the present invention combines a PFBC boiler and Benfield carbon dioxide capture processes to provide up to 95% reduction of the $CO_2$ greenhouse gas emissions from coal combustion. Further this combination of the Benfield capture process and a PFBC boiler burning a mix of coal and renewable biomass can result in a power plant with a negative carbon foot print.

In various embodiments, the interface includes a pressurized gas to water heat recovery boiler (HRSG) that generates steam to the steam turbine and cools down combustion gas from the PFBC boiler. A pressurized scrubber and a fabric filter clean the gas to conditions suitable for treatment in a Benfield potassium carbonate-based pressurized carbon dioxide separation technology. The interface includes a scrubber and a fabric filter for dust separation so one or both stages of the cyclones inside the PFBC pressure vessel might be eliminated. The interface also receives the $CO_2$ depleted gas after the $CO_2$ separation process and delivers it to the inlet of the plant stack close to atmospheric pressure.

In various embodiments, due to the replacement of the gas turbine with a VFD motor and gas expander driven compressor, the invention provides a PFBC power generating facility free of traditional design restrictions presented by the capacity limitations of the standard gas turbine compressor to provide combustion air to the PFBC combustion process.

In various embodiments, due to the replacement of the gas turbine with a VFD motor and gas expander driven compressor the invention provides a PFBC power generating facility not being limited in design by the PFBC combustion pressure and flue gas temperature to provide the gas turbine specified inlet gas conditions.

In various embodiments, the invention provides a power generation facility having low emissions and being capable of capturing pressured carbon dioxide in combustion gas emitted from a PFBC facility. The facility has carbon dioxide capture ratio above 90%, and is expected to meet all the US EPA emission limits for generation facilities to low emissions of sulfur oxides, nitrogen oxides, volatile organic compounds, carbon monoxide and particulate matter.

Other embodiments, features, aspects and advantages of the present invention will become better understood or apparent from the following detailed description, drawings, and appended claims of the invention.

BRIEF DESCRIPTION OF THE DETAILED DRAWINGS

The accompanying drawings illustrate examples of embodiments of the invention. In such drawings:

FIG. 4 shows a graph of process conditions in an example of an embodiment of the present invention when adapted for use in a 100 MWe size plant.

DETAILED DESCRIPTION OF EXAMPLES OF THE INVENTION

In embodiments the invention is directed to a readiness interface to enable a PFBC plant to be ready for the addition of a carbon dioxide capture system. The interface comprises configuring an HRSG to cool pressurized flue gas output from the PFBC plant and substituting a VFD motor/gas expander driven compressor for the typical gas turbine compressor to run the PFBC process. The carbon dioxide capture system can be added on later without any impact or changes to the PFBC process, a change which could not be done on the "standard" PFBC with the gas turbine. An advantage of the readiness interface is the plant can be "ready" for the addition of a carbon dioxide capture system, but built without it, which, considering the current uncertainty about the carbon dioxide regulation, can be a benefit from a commercial point of view.

Figure 1:
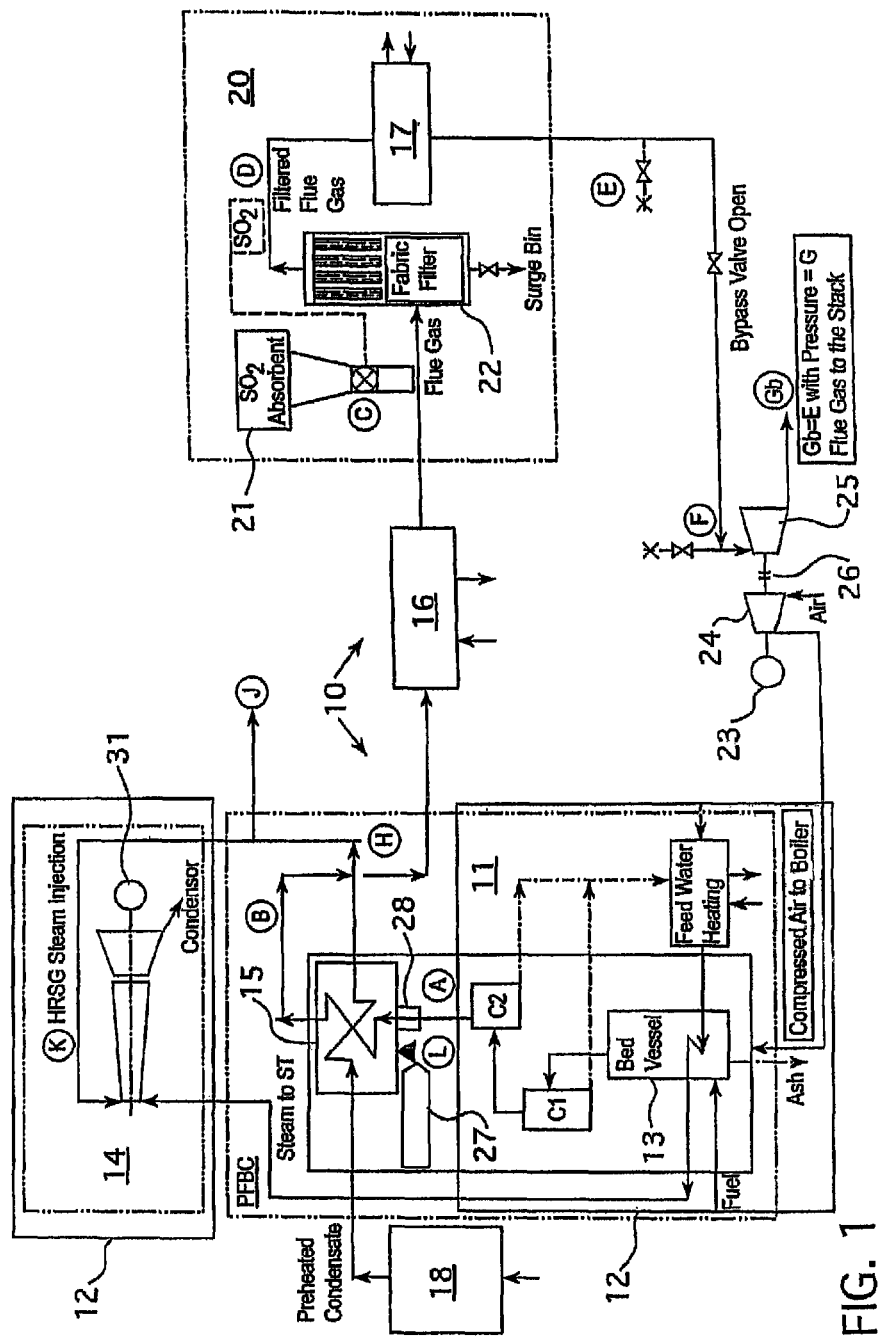
FIG. 1 shows an overview of the readiness interface in use with a PFBC facility according to an embodiment of the present invention.

An overview of the readiness interface is illustrated for example in FIG. 1. Interface 10 includes gas to water pressurized heat recovery steam generator 15 that is configured to cool pressurized flue gas from boiler 13 of pressurized fluidized bed combustion facility 12 and provide steam to steam turbine generator 14 of facility 12. A first gas to water feedwater heat exchanger 16 or group of gas to water feedwater heat exchangers preheat feedwater of the combustion facility and cool the pressurized flue gas. A pollutant reduction unit 20 removes pollutants from the cooled pressurized flue gas from the first feedwater heat exchanger 16 and directs the cleaned gas to a flue gas expander 25. Optionally, a second gas to water feedwater heat exchanger 17 cools the flue gas from the pollutant reduction unit 20 and directs the cleaned gas to a flue gas expander 25. Flue gas expander 25 is driven by the pressure of flue gas from the pollutant reduction unit 20 and/or second feedwater heat exchanger 17. Gas expander 25 assists in driving the combustion air compressor 24 by reducing the pressure of the flue gas to the atmospheric stack conditions, and releases carbon dioxide depleted gas. Flue gas expander 25 is synchronized over a SSS-clutch 26 to drive combustion air compressor 24 in combination with VFD motor 23. Compressor 24 provides combustion air to boiler 13 of the pressurized fluidized bed combustion facility 12.

In embodiments, the invention is directed to a method to condition pressurized flue gas from a pressurized fluidized bed combustion facility. The method includes reducing the temperature of flue gas from the combustion facility in a gas to water pressurized heat recovery steam generator, providing steam from the heat recovery steam generator to a steam turbine generator of the combustion facility, reducing the temperature of pressurized flue gas from the heat recovery steam generator, reducing pollutants from the flue gas, and expanding the flue gas in a gas expander to drive a compressor that generates compressed air to fuel the combustion facility. The method can include the further step(s) of synchronizing the gas expander over a SSS-clutch to drive the compressor and/or powering the compressor with a motor, such as a VFD motor. The method can include capturing carbon dioxide from the flue gas in a pressurized carbon dioxide capturing process unit, before expanding the flue gas and releasing carbon dioxide depleted flue gas to a flue gas stack. Optionally, the reducing of pollutants includes the reducing of sulfur dioxide, conducted to minimize the consumption of capturing agent in the carbon dioxide capture technology process.

Figure 2:
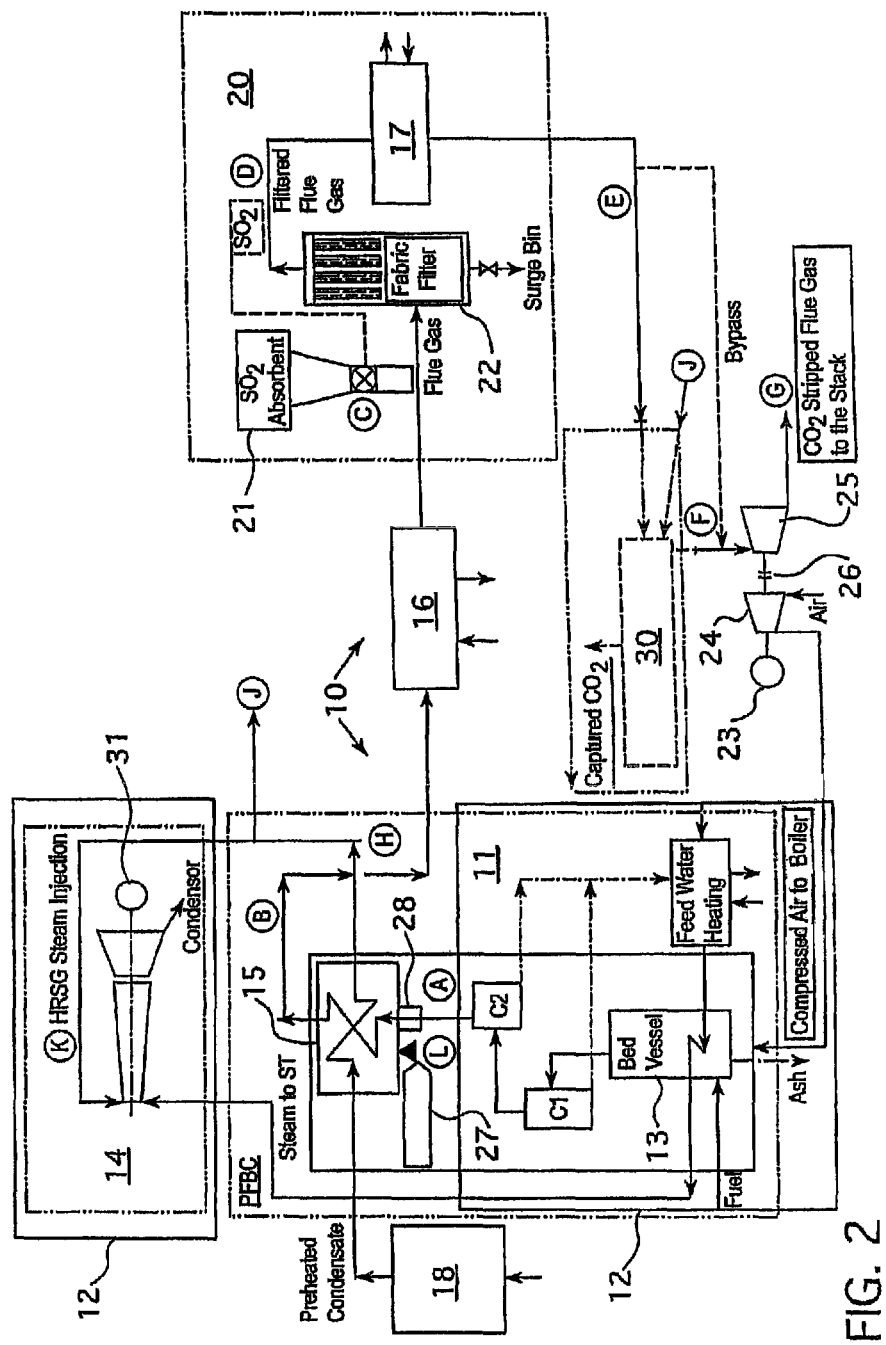
FIG. 2 shows an overview of the interface between a PFBC facility and Benfield Process facility according to an embodiment of the present invention.

In various embodiments, the interface includes carbon capture capabilities. As shown for example in FIG. 2, embodiments of the invention relate to a carbon dioxide capture heat recovery steam generator (HRSG) interface (referred to as $E_sCO_2ST$) between a PFBC boiler plant and a Benfield $CO_2$ capturing process unit or other pressurized potassium carbonate solution, or similar capturing agent, $CO_2$ capturing unit. As illustrated in FIG. 2, for example, interface 10 adapts PFBC facility 12, having pressurized combustor 11, and a steam cycle 14 (such as a Rankine type of steam cycle), with a turbine driving a generator 31 for electricity generation and/or providing steam for district heating and/or steam for a process load. The interface 10 generally consists of a gas to water pressurized HRSG 15 connected to one or more gas to water feed water heaters 16, pollution reduction facility 20, and, optionally, one or more gas to water feedwater heaters 17 that connect the PFBC facility 12 to the Benfield $CO_2$ capturing process unit 30. From pollution reduction facility 20 or gas to water feedwater heat exchanger 17, flue gas is directed to a pressurized carbon dioxide capturing process unit 30 before being directed to flue gas expander 25. The flue gas expander 25 drives compressor 24 together with motor 23 to provide the combustion air to the PFBC boiler 13.

In examples motor 23 is solidly coupled to compressor 24 shaft and is the main driver from the start and up to its maximum torque (approximately 80%). Thereafter the flue gas expander 25 is synchronized over SSS-clutch 26 to add the necessary torque (approximately 20%) to drive the compressor 24 up to full load. Compressor 24 directs compressed air to the boiler 13.

In embodiments the interface conditions the PFBC combustion gas for treatment by a $CO_2$ capturing unit. In an example, a pressurized heat recovery boiler 15 and feedwater heat exchangers 16 and 17 reduce the PFBC combustion gas temperature from about 1562° F. to about 350° F. to 212° F., or a temperature that fits the process conditions in the $CO_2$ capturing unit. The energy in the flue gas temperature drop is used for steam generation and for feed water heating as it fits the process. Optionally, a Selective Catalytic Reduction (SCR) unit 28 reduces nitrogen oxides from the combustion gas. The combustion gas is also cleaned in a pollution reduction facility 20. In an example, pollution reduction facility 20 includes a sulfur dioxide and particulate matter reduction unit 21 and a fabric filter 22. Scrubber 21 and fabric filter 22 remove particulates and $SO_2$ from the flue gas that could otherwise degrade the $CO_2$ capture agents in the Benfield carbon dioxide capture process, and direct the gas for further treatment in Benfield process 30. After treatment in the Benfield process 30, the $CO_2$ stripped flue gas is then expanded in a gas expander 25 and the energy in the pressure drop is converted to mechanical torque to assist in driving the compressor 24. Following the pressure reduction, the $CO_2$ stripped flue gas may be released to atmosphere. To optimize the energy usage, other sources of heat such as the PFBC and $CO_2$ capture processes can be considered for feedwater heating. Optionally, following the Benfield process, the captured $CO_2$ can be sequestered and stored underground or put to beneficial use for Enhanced Oil Recovery, growth of algae, fertilizer, etc.

In embodiments, the pressurized flue gas from the PFBC boiler 13 is led to a pressurized gas to water heat recovery steam generator (HRSG) 15 where the water side together with feedwater heat exchangers 16 cools down the flue gas to the conditions suitable for the scrubber 21 and the Benfield process 30. The cooled flue gas is led to a $SO_2$ absorber 21 for flue gas desulfurization (FGD) by injecting sodium bicarbonate, limestone or similar $SO_2$ capturing agent, using wet scrubber, dry, or SDA (Spray Drying Absorption) technology. The flue gas is directed through a fabric filter 22 for particulate removal. In embodiments in which a wet scrubber is utilized for the $SO_2$ adsorption process, particulate removal may be unnecessary. In that case the fabric filter 22 might not be used.

Thereafter the flue gas can be led through a feed water heat exchanger(s) 17 for cooling down the flue gas to suitable conditions for the Benfield $CO_2$ capture process. In an example, depending upon the total cycle, the additional exchanger(s) 17 might not be needed. They may be used depending upon capacity and balancing the heat cycle in the process. The number of and location of the indicated feedwater heat exchangers 16, 17, and 18 depends on each specific plant cycle condition. This includes the shown location and the number of could be a combination of several heaters and locations along the feedwater loop.

Pressurized carbon dioxide capturing process unit (such as the Benfield $CO_2$ capture process) 30 absorbs the carbon dioxide from the flue gas stream using a pressurized aqueous potassium carbonate solution $CO_2$ capturing agent. In an example, to minimize the consumption of the $CO_2$ capturing agent needed for the carbon dioxide capturing process unit 30, the PFBC boiler is equipped with a NOx reduction unit 28. In examples, $NO_x$ reduction unit 28 is a selective cathalytic reduction (SCR) and/or ammonia injection for control of the $NO_x$ emissions. This cleans $NO_x$ from the combustion gas from the PFBC process at the exit of the boiler 13. It should be positioned in an area where the temperature is optimal to reduce $NO_x$ in the flue gas stream out of the PFBC boiler. In examples, the sulfur dioxide absorber 21 is designed to reduce or remove the $SO_2$ from the flue gas in an amount effective to minimize the consumption of capturing agent used in the carbon dioxide capturing process unit 30. This reduction is determined by acceptable level of capturing agent consumption to reduce the cost of consumables during the operation of the plan.

Figure 3:
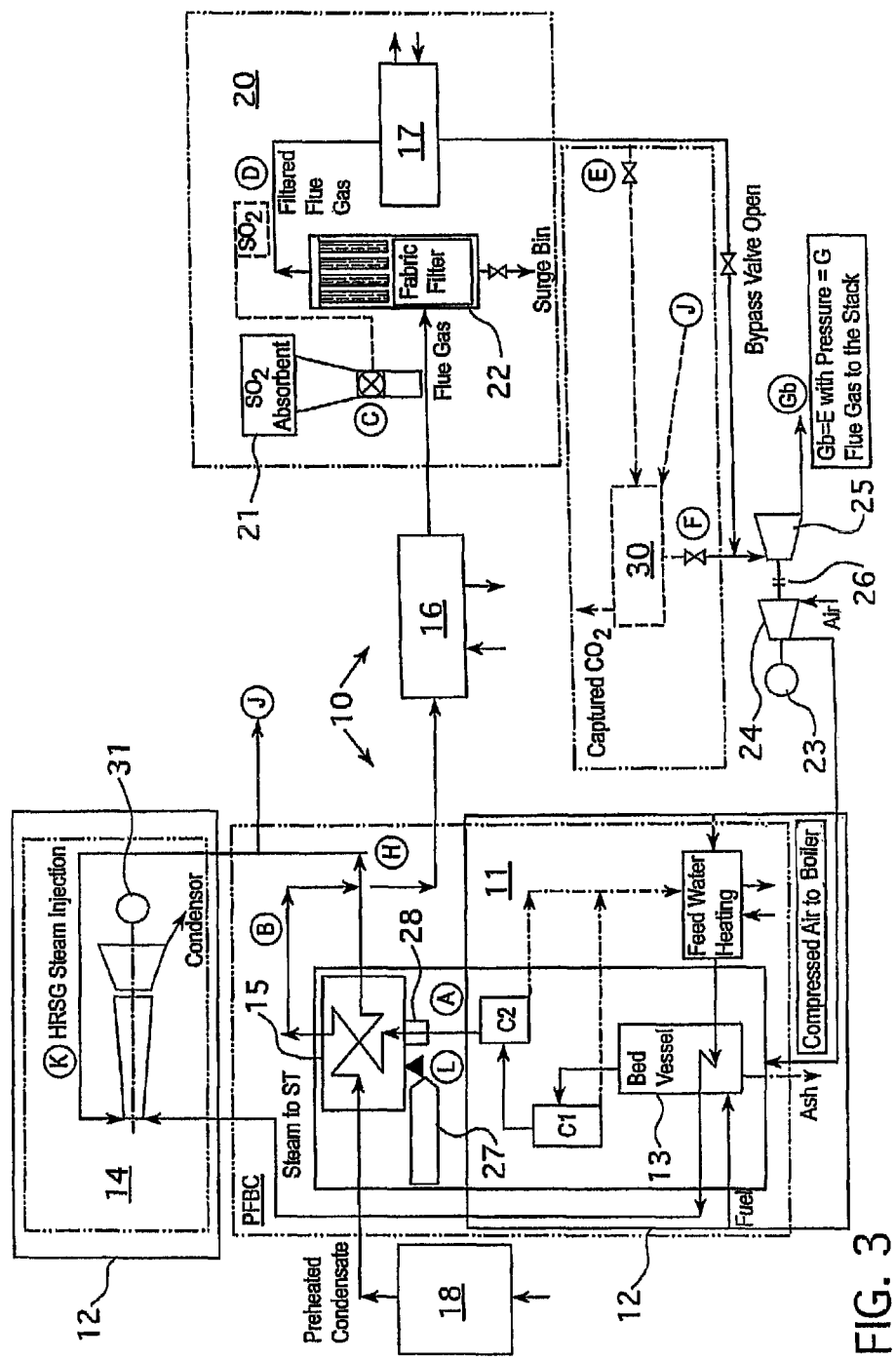
FIG. 3 shows an overview of the interface between a PFBC facility and Benfield Process when the bypass mode is operational according to an embodiment of the present invention.

After carbon dioxide capture 30, the cleaned flue gas is led to a gas expander 25. This reduces the pressure to the stack conditions and adds torque to the drive of the combustion air compressor 24 after which the flue gas is led to the stack. In examples, such as shown in FIG. 3, the carbon dioxide capture process 30 is bypassed. Instead, the flue gas from the first 16 or second 17 feedwater heat exchanger, or both, is fed directly to the flue gas expander 25 bypassing the carbon dioxide capturing process unit 30.

In various embodiments during start up the combustion air compressor 24 is disconnected from the flue gas expander 25 by a SSS clutch 26 and the compressor 24 is solely driven by a frequency controlled electrical (VFD) motor 23 until the flue gas expander 25 is ready to engage and together with the VFD motor drive the compressor 24. In embodiments for increased thermal power, duct firing 27 is added for use of alternate gaseous fuels.

The feedwater to the HRSG 15 is heated in feedwater heat exchanger 18. The steam generated by the HRSG 15 is led to the steam turbine 14 for generation of electricity. Steam to the steam turbine cycle 14 is generated on the water side of the PFBC boiler 13 and the pressurized HRSG 15. The feedwater to the PFBC boiler and the HRSG is preheated in the feedwater heaters 16, 17 and/or 18, and in the PFBC boiler 13 and Benfield processes 30 as it fits to optimize the energy usage in the total steam cycle. The number and location of the feedwater heaters may vary depending on the specific project conditions. In examples, depending on the process conditions, the feedwater heat exchangers 16, 17 and 18 can be one, more, or none. But there will always be some combination of feedwater heaters in some locations.

In various embodiments, process conditions at a 90% $CO_2$ removal are shown for example in FIG. 4. The conditions will vary due to variation in fuel quality, percent $CO_2$ removal, boiler size and other process conditions.

In examples, the invention provides a power generation facility. The facility includes a PFBC process 12 wherein air is compressed to about 174 PSI in a VFD motor/flue gas expander driven compressor 24. The compressed air flows to a combined pressurized combustor 11 and steam boiler 13. The combustor is a robust pressurized fluidized bed capable of firing a variety of coal qualities mixed with biomass. Typically the firing temperature is about 1562° F., which is below the ash melting temperature. The fluid bed is cooled by steam production. Most of the particles and fly ash produced in the fluid bed are removed from the flue gas in a two-stage cyclone system (C1, C2) located inside the pressurized combustor 11. In an example, a typical 100 MWe size plant operates under the process conditions set out in FIG. 2. These conditions will vary to adapt to the plant size of interest.

Relative to the flue gas from a conventional atmospheric combustion plant, the flue gas from the PFBC combustor has lower mass flow, lower volume flow, higher total pressure and higher $CO_2$ partial pressure. It also has very low oxygen content. This gas can therefore be well suited for $CO_2$ capture using technologies that can take advantage of these features, such as the Benfield process, to lessen the cost and energy penalty associated with separating the $CO_2$. The interface and power generation facility are designed to appropriately condition the temperature, pressure and cleanliness of the boiler combustion flue gas to fit the Benfield process conditions in a way that the energy in the flue gas can be converted to usable energy.

Another novelty of this invention is that it overcomes the limitations presented with the standard PFBC design, which is based on a gas turbine technology that uses the temperature, pressure, and mass flow of the flue gas as the drive media and has a fixed design point for the best output and efficiency. As designed the HRSG based PFBC facility has no limitation of a fixed design point giving a greater freedom to optimize the total cycle efficiency. The VFD motor/gas expander driven compressor can be adapted to fit each specific process condition. With the VFD motor/gas expander there is also no need to keep up the flue gas temperature after the HRSG as would typically be required by a gas turbine/gas expander only based PFBC boiler process. The efficiency, of the standard PFBC gas turbine process in combination with the Benfield type of $CO_2$ capture will suffer from the additional pressure drop, loss of temperature, and flue gas mass flow in the Benfield $CO_2$ capture process.

The HRSG/VFD motor/gas expander based PFBC process uses the heat in the flue gas flow to generate steam in the HRSG and after the Benfield process the pressure reduction of the $CO_2$ depleted clean flue gas flow drives a gas expander that adds torque to the drive of the combustion air compressor that gives the operator freedom to select and optimize the overall process conditions to fit each project requirements.

While the presently preferred embodiments of the invention have been shown and described, it is to be understood that the detailed embodiments are presented for elucidation and not limitation. The invention may be otherwise varied, modified, or changed within the scope of the invention as defined in the appended claims.

What is claimed is:

1. An interface for reducing emissions from a pressurized fluidized bed combustion facility, said interface comprising:
    an air compressor that is connected to the pressurized fluidized bed combustion facility and that supplies compressed air to the fluidized bed combustion facility;
    a gas to water pressurized heat recovery steam generator that receives flue gas from the fluidized bed combustion facility at a first input and that receives water at a second input, said heat recovery steam generator also having a first output that discharges flue gas and a second output that discharges steam at times when the temperature of flue gas that is discharged at the first output is lower than the temperature of flue gas that is received at the first input;
    a steam turbine generator that receives steam from the second output of the gas to water pressurized heat recovery steam generator, said steam turbine generator generating electrical energy in response to steam inflow from the pressurized heat recovery steam generator, said steam turbine generator being electrically connected to a motor that powers said air compressor; and
    a flue gas expander that is in communication with the first output of said gas to water pressurized heat recovery steam generator, said flue gas expander being mechanically connected to said air compressor to power said air compressor in response to flue gas from the pressurized heat recovery steam generator, said flue gas expander powering said air compressor in combination with the motor that is electrically connected to the steam turbine generator.

2. The interface of claim 1 further comprising a carbon dioxide removal unit that has an input that is in communication with the first output of the gas to water pressurized heat recovery steam generator, said carbon dioxide removal unit having an output that is in communication with the flue gas expander, said carbon dioxide removal unit removing carbon dioxide from the flue gas that is provided to the flue gas expander.

3. The interface of claim 1 further comprising at least one heat exchanger that has an input that is in communication with the first output of the gas to water pressurized heat recovery steam generator, said heat exchanger having an output that is in communication with said flue gas expander, wherein the temperature of flue gas that is discharged at said output is lower than the temperature of flue gas received at said input.

4. The interface of claim 3 further comprising a pollutant reduction unit that is in communication with the second output of the gas to water pressurized heat recovery steam generator, said pollutant reduction unit also being in communication with said flue gas expander, said pollutant reduction unit removing air pollutants from flue gas that is discharged from the first output of said gas to water pressurized heat recovery steam generator.

5. The interface of claim 4 further comprising a carbon dioxide removal unit that has an input that is in communication with the first output of the gas to water pressurized heat recovery steam generator, said carbon dioxide removal unit having an output that is in communication with the flue gas expander, said carbon dioxide removal unit removing carbon dioxide from the flue gas that is provided to the flue gas expander.

6. The interface of claim 1 further comprising a duct firing element that is included in the gas to water pressurized heat recovery steam generator.

7. An interface that enables the selective addition of carbon dioxide capture from the flue gas of a pressurized fluidized bed combustion facility, said interface comprising:
    a combustion air compressor, configured to supply combustion air to the combustion facility;
    a VFD electric motor coupled to the combustion air compressor;
    a gas to water pressurized heat recovery steam generator that is connected to a water supply and to a steam turbine generator of the combustion facility, said pressurized heat recovery steam generator also being connected to the pressurized bed combustion facility and receiving pressurized flue gas from the fluidized bed combustion facility, said heat recovery steam generator lowering the temperature of the pressurized flue gas from the combustion facility and providing steam to the steam turbine generator of the combustion facility;
    a steam turbine generator that receives steam from the heat recovery steam generator and that generates electrical power in response to said steam from the heat recovery steam generator and provides electrical power to said VFD electric motor;
    a feedwater heat exchanger for preheating feedwater of the combustion facility and cooling the pressurized flue gas;

a pollutant reduction unit configured to remove pollutants from the cooled pressurized flue gas from the feedwater heat exchanger; and a flue gas expander driven by the flue gas from the pollutant reduction unit, wherein the expander is synchronized over an SSS-clutch to drive the compressor in combination with the VFD electric motor.

8. The interface of claim 7, further comprising a pressurized carbon dioxide capturing process unit for treating the flue gas of the feedwater heat exchanger or pollutant reduction unit prior to using the flue gas to drive the flue gas expander.

9. The interface of claim 7, further comprising a second feedwater heat exchanger configured to cool the flue gas from the pollutant reduction unit.

10. The interface of claim 7, further comprising a duct firing unit configured to increase the thermal output of the heat recovery steam generator.

11. The interface of claim 7, further comprising selective catalytic reduction or an ammonia injection, or both, configured to remove nitrogen oxides from the flue gas of the combustion facility.

12. The interface of claim 7, wherein the pollutant reduction unit comprises a sulfur dioxide absorber configured to remove sulfur from the flue gas cooled down in the feedwater heat exchanger, and a particulate matter reduction unit configured to remove particulate matter from the flue gas.

13. The interface of claim 12, wherein the sulfur dioxide absorber is selected from the group consisting of bicarbonate injection, wet scrubber, spray drying adsorption, and flue gas desulfurization.

14. The interface of claim 12, wherein the sulfur dioxide absorber is designed to reduce or remove the sulfur dioxide from the flue gas in an amount to control the consumption of capturing agent used in the carbon dioxide capturing process unit.

15. A method to condition pressurized flue gas from a pressurized fluidized bed combustion facility to supplement the power needed to run the combustion facility comprising:

reducing the temperature of flue gas from the combustion facility in a gas to water pressurized heat recovery steam generator;

providing steam from the heat recovery steam generator to a steam turbine generator of the combustion facility;

reducing the temperature of pressurized flue gas from the heat recovery steam generator in a feedwater heat exchanger;

reducing pollutants from the flue gas; and expanding the flue gas in a gas expander to drive a compressor, wherein the compressor generates compressed air to fuel the combustion facility.

16. The method of claim 15, further comprising the step of synchronizing the gas expander over a SSS-clutch to drive the compressor.

17. The method of claim 15, further comprising the step of powering the compressor with a VFD motor.

18. The method of claim 15, further comprising the step of capturing carbon dioxide from the flue gas in a pressurized carbon dioxide capturing process unit, before expanding the flue gas.

19. The method of claim 18, further comprising the step of directing the carbon dioxide depleted flue gas to a flue gas stack.

20. The method of claim 15, wherein the reducing pollutants comprises:

removing or reducing sulfur dioxide from the flue gas from the feedwater heat exchanger in a sulfur dioxide absorber; and removing particulate matter from the flue gas using a particulate matter reduction unit.

* * * * *